UNITED STATES PATENT OFFICE 2,041,455

AZO-DYESTUFFS AND PROCESS OF MAKING THE SAME

Gérald Bonhôte, Basel, and Carl Apotheker, Riehen, Switzerland, assignors to firm of Society of Chemical Industry in Basle, Basel, Switzerland No Drawing. Application April 10, 1935, Serial No. 15,694. In Switzerland April 19, 1934

6 Claims. (Cl. 260—90)

The present invention depends upon the surprising observation that the nitramine of the formula

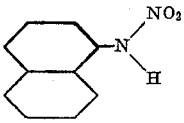

possesses the property of forming azo-dyestuffs by coupling with diazo-compounds which are unchanged or only slowly changed by dilute alkalies. Such compounds are above all the diazo-compounds obtained from bases of the general formula

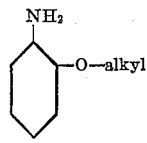

Such products are inter alia ortho-anisidine, ortho-phenetidine or

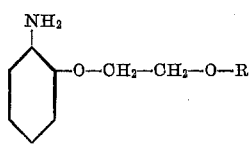

wherein R stands for

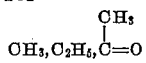

and the like. There are thus obtained dyestuffs which are very valuable as such, and particularly as parent materials for the manufacture of further dyestuffs.

The new dyestuffs correspond therefore to the general formula

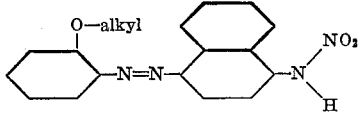

in which the radical alkyl has the signification indicated above. They are brown-red powders and dissolve in aqueous alkalies to brown-red solutions.

The following example illustrates the invention:—

68.5 parts of 1-amino-2-ethoxybenzene are diazotized in usual manner. The diazo-solution is mixed with 62.5 parts of sodium-carbonate whereupon it reacts weakly alkaline. The diazo-solution is added in drops at 0–10° C., while stirring, to a solution consisting of 105 parts of the sodium salt of the nitramine of 1-aminonaphthalene in 500 parts of water. The solution immediately becomes dark red and after a short time the nitramine sodium salt of the aminoazo-compound begins to separate as a red-brown precipitate. Stirring is continued for 10–15 minutes at 0–10° C., whereupon the solution is filtered by suction and crystallized from water. There are obtained brown-red laminæ which are easily soluble in water. The free acid is obtained by acidifying the ice-cold aqueous solution of the sodium salt with acetic acid and crystallizing the dried precipitate from acetone. It forms brown-red laminæ of melting point 98–99° C.

The procedure is similar with other diazo-compounds such as, for example, 1-amino-2-methoxybenzene, which are not changed in a solution rendered alkaline by sodium carbonate.

The nitramines obtained in such a manner may be used as described in application Serial No. 701,375, filed December 7, 1933, for producing fast tints on the fiber. For example, the cotton may be printed with a mixture consisting of the sodium salt of the new azo-dyestuff, alkali-nitrite, and 2,3-hydroxynaphthoic acid-anilide, then dried, passed through an acid bath and, if desired, treated with an acid binding agent. By such a method black-violet tints may be obtained. Black tints are obtained when the β-naphthylamide is substituted for the anilide of 2,3-hydroxynaphthoic acid.

What we claim is:—

1. Process for the manufacture of azo-dyestuffs, consisting in coupling the diazo-compounds of amines of the general formula

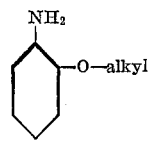

with the N-nitramine of 1-aminonaphthalene.

2. Process for the manufacture of azo-dyestuffs, consisting in coupling the diazo-compounds of amines of the general formula

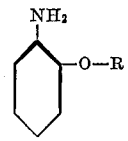

in which R stands for an alkyl residue of the group consisting of $CH_3$ and $C_2H_5$, with the N-nitramine of 1-aminonaphthalene.

3. The azo-dyestuffs of the general formula

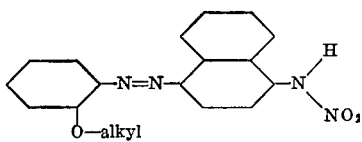

which products are brown-red powders dissolving in aqueous alkalies to brown-red solutions.

4. The azo-dyestuffs of the general formula

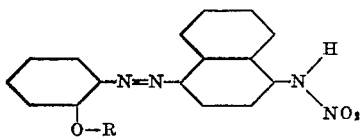

in which R stands for an alkyl residue of the group consisting of $CH_3$ and $C_2H_5$, which products are brown-red powders dissolving in aqueous alkalies to brown-red solutions.

5. The azo-dyestuff of the formula

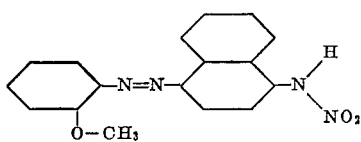

which product is a brown-red powder dissolving in aqueous alkalies to a brown-red solution.

6. The azo-dyestuff of the formula

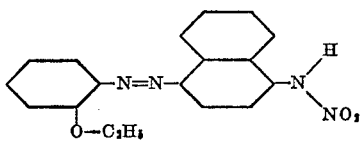

which product is a brown-red powder dissolving in aqueous alkalies to a brown-red solution.

GÉRALD BONHÔTE.
CARL APOTHEKER.